Dec. 18, 1956   F. J. BUCHER   2,774,889
CONTROL CIRCUIT FOR A SERIES OF ELECTRICAL UNITS
Filed June 22, 1954   4 Sheets-Sheet 1

INVENTOR.
FRED J. BUCHER
BY

INVENTOR.
FRED J. BUCHER

Dec. 18, 1956  F. J. BUCHER  2,774,889
CONTROL CIRCUIT FOR A SERIES OF ELECTRICAL UNITS
Filed June 22, 1954  4 Sheets-Sheet 3

INVENTOR.
FRED J. BUCHER
BY

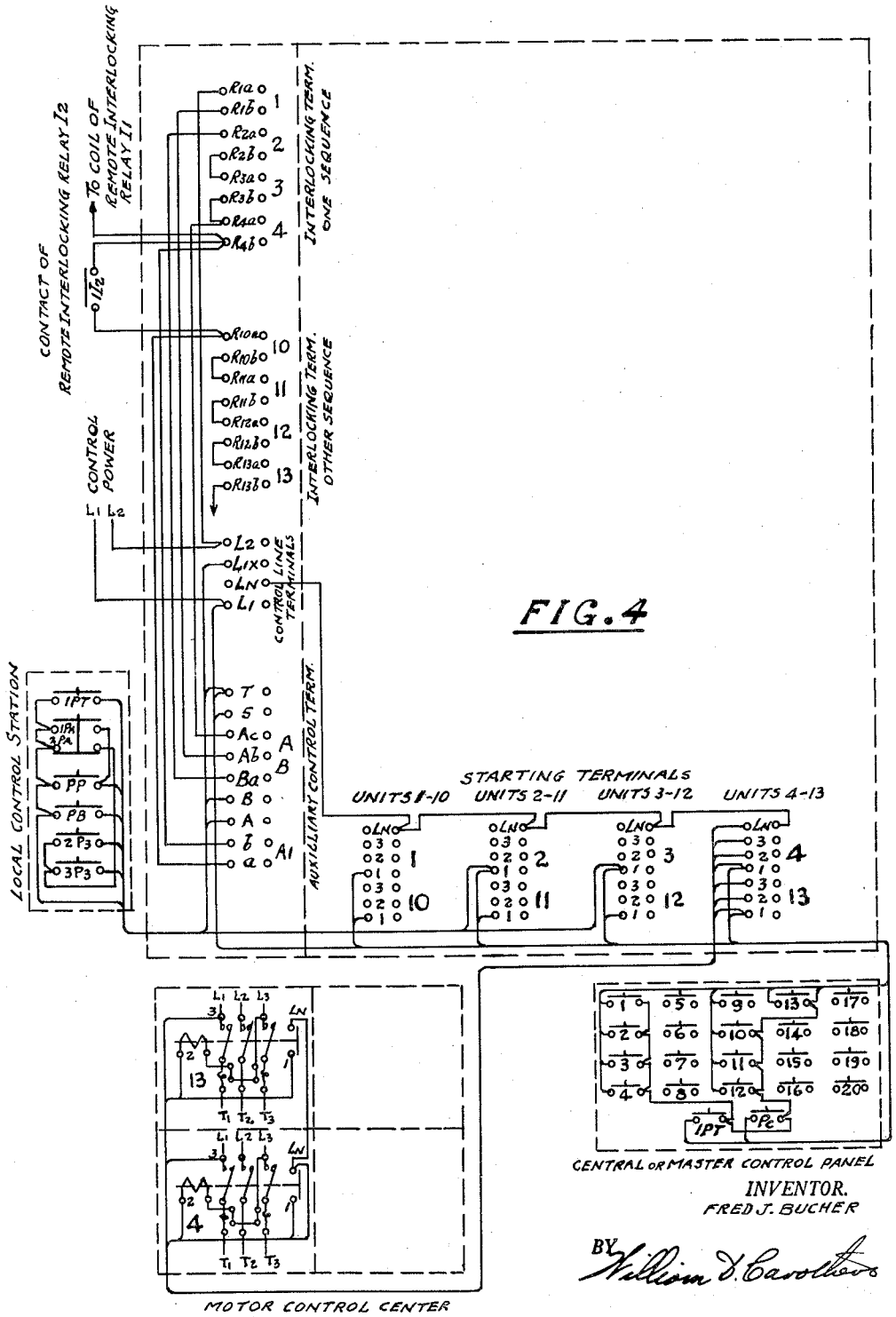

United States Patent Office 2,774,889
Patented Dec. 18, 1956

2,774,889

CONTROL CIRCUIT FOR A SERIES OF ELECTRICAL UNITS

Fred J. Bucher, Library, Pa.

Application June 22, 1954, Serial No. 438,571

21 Claims. (Cl. 307—112)

This invention relates generally to control circuits and more particularly to control circuits for a series of electrical units which operate in associated relation.

A very good example for the application of this invention is in the control circuits for a coal washing plant wherein multiple groups of a series of conveyors and other associated electrical units must be started and operated and stopped in a predetermined sequence.

The principal object of this invention is the provision of a control circuit that may be reduplicated to produce a multiplicity of independent control circuits that when connected with each other controls a series of electrical units operating in sequence. That is attained by providing uniformity in each independent control circuit and making up the interconnecting circuits through terminal boards connection of selected parts of which complete the control circuits. The control circuits may be readily changed at these terminal boards to change the sequence of operation with very little time and expense.

Another object is the provision of a control circuit that may be readily reduplicated to provide a plurality of control stations with a minimum of interconnecting wires.

Another object is the provision of a control circuit which separates the polarities of each associated group of electrical units and thus simplifies the circuit as well as eliminating chance of failure due to misoperation through insulation failures.

Another object is the provision of a simplified control circuit of separated polarities that is readily tested.

Another object is the provision of a control circuit having an independent test circuit to check the complete operation of selected sequential operations without actually operating the electrical units to be controlled.

Another object is the provision of a control circuit for a mutiple series of electrical units that may be controlled from many duplicate stations and may be started from any one of these stations and in a sequence other than that in which the electrical units are started from any other one of these stations.

Another object is the provision of a control circuit that may trip a group of electrical units in a series without tripping or otherwise interrupting the continued operation of the complete series.

Other objects and advantages appear hereinafter in the following description and claims.

The accompanying drawings show for the purpose of exemplification without limiting the invention or claims thereto certain practical embodiments illustrating the principles of the invention wherein:

Fig. 4 shows the connection of the circuit in Fig. 3 to a motor control center and a central or master control panel such as illustrated in Fig. 1 as well as a local control station.

Figure 1:
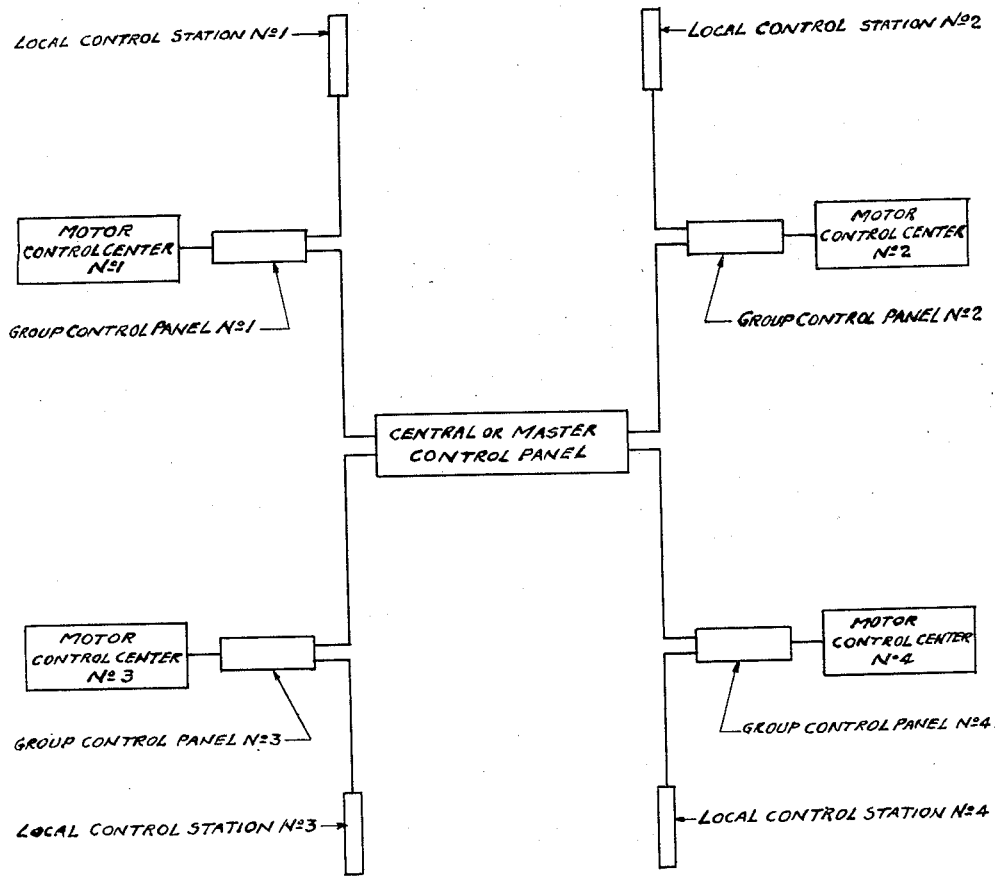
Fig. 1 is a schematic layout illustrating a series of motor control centers and their relative positions to their respective group control panels and a central or master control panel and local control stations.

The control circuits shown on the drawings are such as would be employed in controlling a series of electrical units in a coal washing plant and the general layout of the control circuit as illustrated in Fig. 1 shows the central or master control panel from which any one of a group of motor control stations may be started or stopped. As shown in Fig. 1 the central or master control panel is connected by means of wires through cables to the motor control center No. 1 through its group control panel No. 1, the motor control center No. 3 through its group control panel No. 3 as represented on the left side of the central or master station, and the motor control centers No. 2 and 4 through their respective group control panels 2 and 4 as represented on the right side of the central or master control panel. Each of the motor control centers is likewise provided with an additional local control station. One station is shown connected to each of the group control panels, the stations being capable of operating each of the electrical units through the group control panel and the motor control center of the respective group. Also some of the local control stations may likewise be provided with means for stopping and starting motors in motor control centers other than the group with which the particular local control station is associated.

Each of the motor control centers, 1–4, as shown in Fig. 1 actually represents the circuit including the motor which is operated and the control or starting switch. The control or starting switch may or may not be located at the same position as the motor. However, generally speaking, it is preferable to have the motor switch at the vicinity of the motor so that the actual leads supplying the motor are short to provide a very small resistance between the power circuit and the motor.

The group control panels which are associated with each motor control circuit are illustrated in Fig. 1 as being relatively closely associated with their respective motor control centers. However, each group control panel contains the control circuits and not the power circuits and they may be positioned relatively close to the motor control or the motor if these two be separated from each other, or they may be remote of either the motor control center or the central or master control center. In some occasions it is desirable to have the group control panels closely associated with the central or master control panel in which case the latter is not as complete a control unit as in the case where the group control panels would be more or less closer associated with the equipment that it controls.

The central or master control panel is illustrated in Fig. 4 and represents in this particular instance the series of push buttons which actually merely have the power of starting or stopping each of the motor control groups. However, it is possible to make the central or master control panel similar to the local control station which is also illustrated in Fig. 4 which also provides circuits that may be employed for cutting selected units in or out of sequence which is not ordinarily provided in a central or master control panel.

In actual operation the sequence of operating the electrical equipment through a coal washing plant is such that the last operation on the coal is initially started and the sequence of starting the progressive series of electrical units would then start from where the coal is discharged from the washery back to the position where the coal enters the washery. In other words, that electrical equipment which delivers coal to the washery would be started last.

Figure 2:
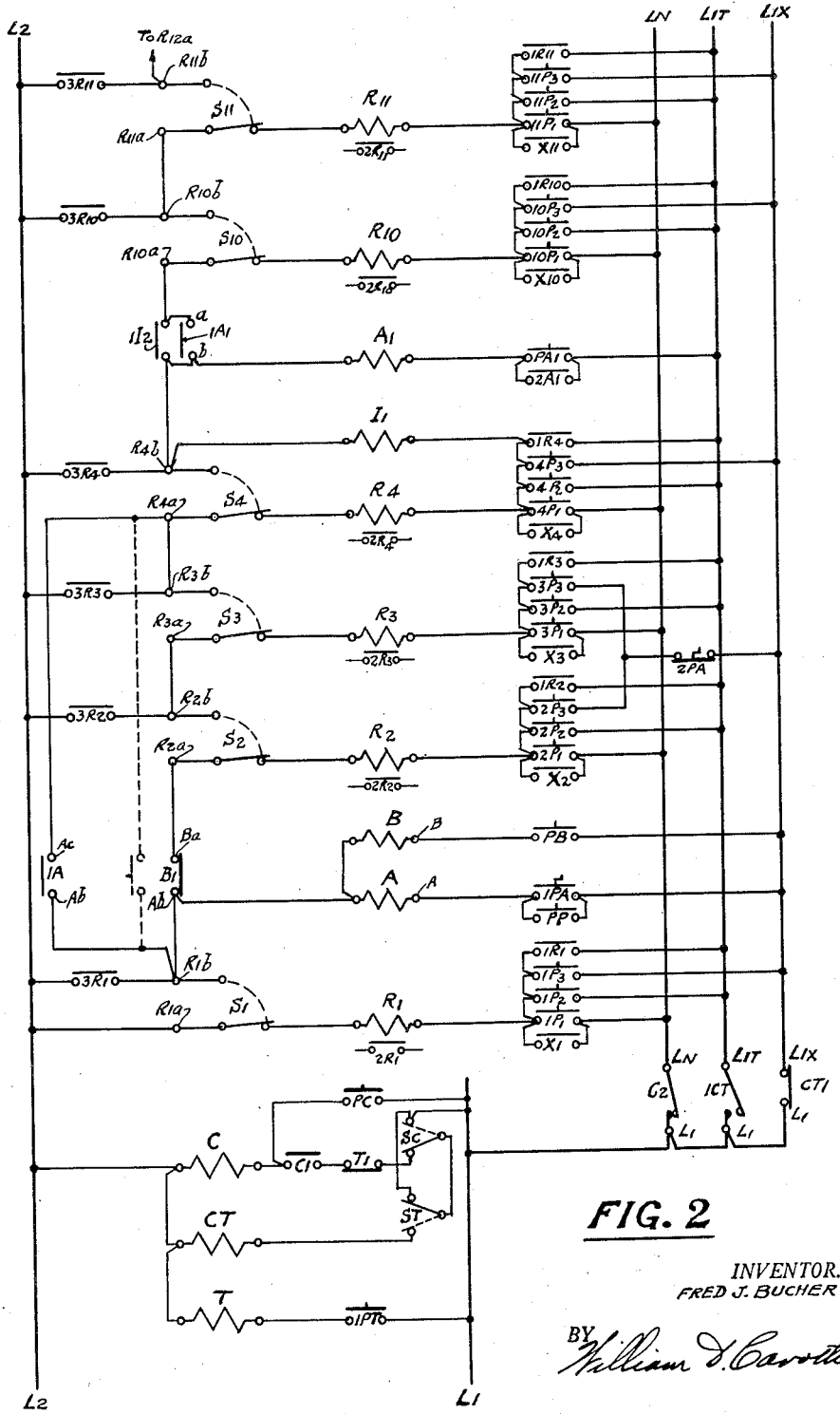
Fig. 2 is a schematic wiring diagram illustrating the control circuit for one group of a series of control circuits for operating electrical units.
Figure 3:
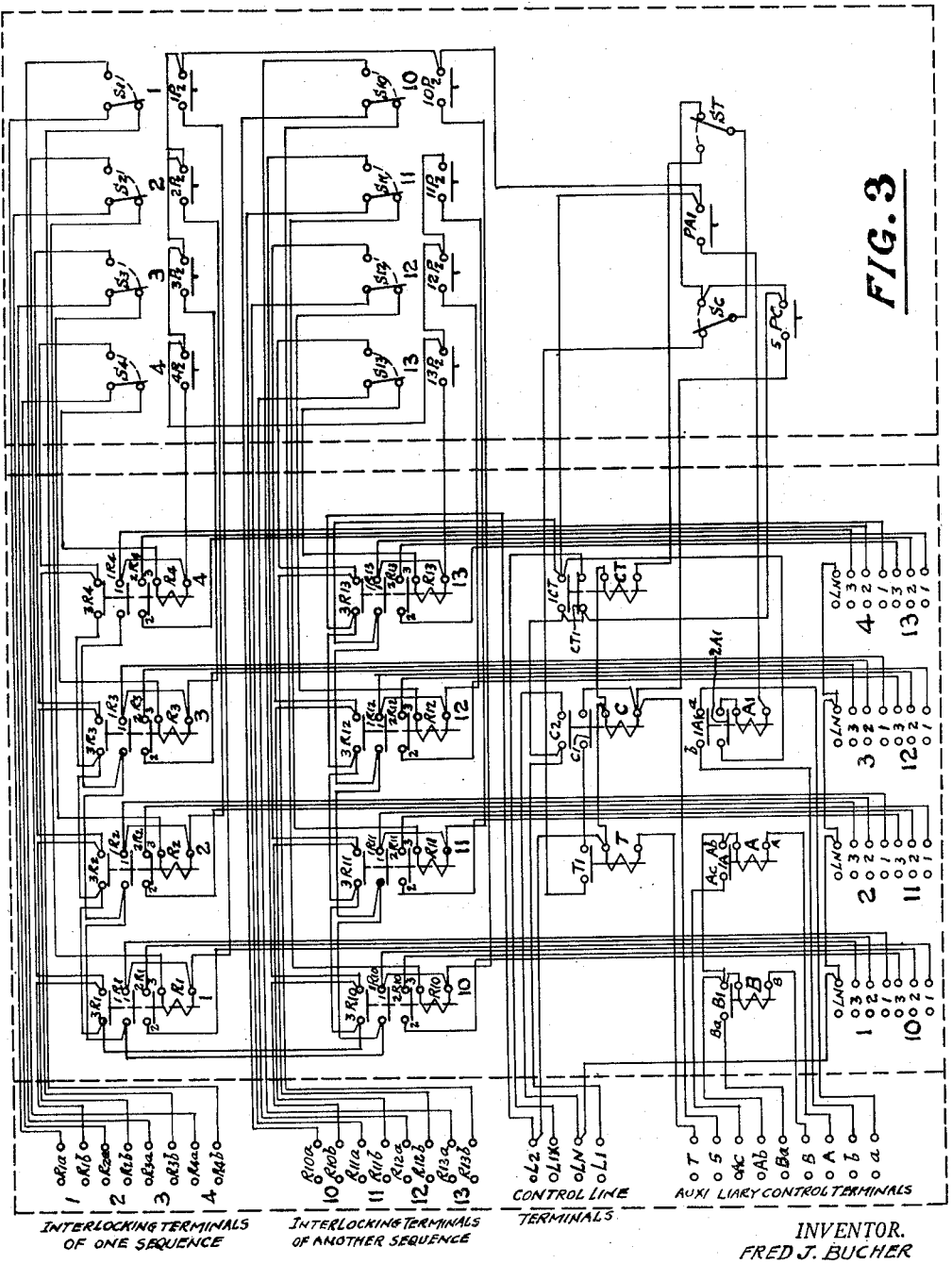
Fig. 3 is a wiring diagram of a circuit as illustrated in Fig. 2.

The consecutive numbers 1 to 4 and 10 to 13 as illustrated in Figs. 2, 3 and 4 of the drawings represent the sequential selection of the electrical units to be operated. In other words, unit 1 may control the discharge of the coal from the washery and unit 2 may have to do with the electrical unit immediately preceding the discharge and so on through the electrical units as designated by the numerals 1, 2, 3 and 4 being operated as a group as distinguished from the electrical units as illustrated in 10, 11, 12 and 13. Units 5, 6, 7, 8 and 9 which are not illustrated in Fig. 3 are obviously units that are operated in a sequence following that of 4 and preceding that of 10 but happen to be in another group control panel and therefore do not appear in Figs. 2, 3 and 4.

In a moderate washing plant one may have fifty-seven or more electrical units which must be operated. However, this number of electrical units may employ anywhere from seventeen to twenty sequence positions or as many as fifty-seven sequence positions, that is one for each electrical unit. However, when any two or more electrical units can be combined under one control in the sequence, this combination is made in order to reduce the number of sequence positions and thus speed up the starting of the plant and reduce the number of starting circuits required.

Thus the positions 1, 2, 3, 4 and 10, 11, 12 and 13, as illustrated in Figs. 2, 3, and 4, represent sequence positions that may control one or more electrical units.

Each of the sequence positions, it will be noted, is provided with an R relay, the R relay being numbered in accordance with the sequence selection that it controls. The R relay is known as a control or starting relay which has a front contact for closing the starting unit of a motor or other electrical equipment that is to be controlled. This starting relay also is provided with one or more additional front contacts which are employed in conjunction with the testing of the circuit and controlling the next R relay which is to be energized in a sequence to complete the sequential operation of the sequence positions as shown. Thus a control relay R may have a number of front and back contacts.

The A and B relays are interlock shunting relays and cut-out relays respectively. These relays are employed in conjunction with manually operated push button controls for completing the circuit to function as a shunt in locking out two or more of a series of the R relays which in effect lock or prevent the operation of the electrical units controlled by such relays. After the interlock shunting relay has been actuated to bypass the control of one or more relays the cut-out or stopping relay B is then energized to stop or open the circuits of those control relays that have been shunted by the interlocking shunting relay A.

The interlocking relays I1–I2 are employed to tie a sequential selection or control of electrical units from one group of units to another group of units which may be remote of the particular group control panel in which it is located. In this manner the sequence such as 1 to 4 must be operated and an interlocking relay I1 is then energized to continue the sequence in another group control panel which carries the sequence from 5 to 9 inclusive, after which an interlocking relay I2 in the group control panel of the latter will be operated to bring the sequence back to the present group control panel as illustrated in Figs. 2 and 4 for operating the sequence of 10 to 13 inclusive.

The C relays as illustrated in Figs 2 and 3 are the control power contactors for the circuit control relays. The CT relay is a test control power contactor for the same group of control relays and the T relay is a tripping relay which may be provided with push button contacts for tripping the whole of the group and these push button controls may be found in any one of a multiple of stations such as the central or master control panel or the local control stations for group control panels other than that in which the local control station is associated.

Ordinarily the control power contactors are provided with dual contacts for opening both sides of the circuit, that is, lines 1 and 2. However, to simplify the circuit as shown only one set of contacts is employed for the purpose of illustrating this invention.

As shown in Fig. 2 power is supplied to the control circuits through the connections as indicated at L1 and L2 which may be either A. C. or D. C. and line 2 would be the ground side of the power supply if one of the two lines is connected to ground. It will be noted that the same side of each of the relays is connected to L2 through the sequence contacts whereas on the opposite side, which would be the potential side L1, each of the relays is connected through its respective control element before being connected to the actual coil of the relay. In this way any failure to ground in a control circuit would not operate the control relays and thus provide a false operation. This is an important feature in the invention of this circuit.

As illustrated in Fig. 2, line 1 and line 2 supply the power for the control relays. The control power contactor C has its coil connected on one side to L2 and it may be connected to L1 through the re-set push button PC which may be duplicated in the central or master control panel and also in the local control station of the respective group to which it is associated.

Upon energizing the contactor C the same is retained closed by its own front contact C1, the back contact T1 of tripping relay T, and through the selector switches SC and ST in series and to L1 thereby closing a circuit that is parallel with the push button PC to maintain the control power contactor C energized.

Upon the energization of the contactor C its contact C2 closes to energize the line LN. The back contact CT1 of the test control power contactor is likewise closed which energizes the line L1X. Thus lines LN and L1X are normally energized.

Upon the energization of both of these lines and upon the selection of selector switches S1, S2, S3, S4, S10 and S11 being positioned as shown, the control relays R of this group may then be energized in their proper sequence as follows.

Upon the closing of push button 1P3 electrical energy is permitted to travel from line L1X through push button 1P3 and the coil of relay R1, the selector switch S1 through line L2 thus energizing relay R1. Upon energizing relay R1 it closes its front contacts 1R1, 2R1, and 3R1. Contact 1R1 has one side connected to the coil side of push button IP3 and its other side connected with line L1T or the test line and since this line is not energized, it will not function to hold the relay closed. The second contact 2R1 is likewise closed and it functions to energize the coil of the starter for the motor or other electrical unit which when closed functions to close its contact X1 and supply current from line LN through said contact X1 and the coil of R1, selector switch S1 to line L2 to maintain relay R1 energized, after which time the push button 1P3 may be released. There is very little time delay in the closing of this circuit through the contact X1, thus a holding circuit is established.

Instead of selecting 1P3 to start R1, one may energize the control relay R1 by the push button 1P1 which would be located at the same position as the electrical unit and it would be in multiple with the contact X1 which in all probability would be located closely adjacent thereto.

Upon the energization of control relay R1 it also closes its front contact 3R1 which connects energy from line 2 through the contact 3R1 to the terminal post R1b, from thence it is connected to terminal Ab and the coils of relay A and relay B. However, these relays are not at this time energized. Therefore relay B has a back contact in this circuit and the current flows from A*b* through the back contact B1 to contact B*a* to terminal R2*a*, thence through selector switch S2 to the coil of control relay R2 at which time either of the push buttons 2P1 or 2P3 can be depressed to energize R2. Since 2P1 is connected directly to line LN the circuit will be completed. If, however, push button 2P3 is employed the current must travel through the back contact of 2PA to L1X in order to complete the circuit.

Upon the energization of control relay R2 it closes its contact 2R2 to energize the starting coil of the electrical unit and the same is actually started and it will close its contact X2 which in turn forms a holding circiut for relay R2.

Upon the closing of relay R2 its third contact 3R2 is closed to connect the circuit from L2 through terminal R2*b* to terminal R3*a* and selector switch S3 to one side of the coil of control relay R3 the other side of which may be connected through the respective push buttons 3P1 or 3P3 in the same manner as previously described. Upon the energization of R3 its contact 2R3 closes to energize the operating control circuit of the electrical unit which in turn closes the contact X3 and maintains the control relay R3 energized to the line LN. The energization of relay R3 also closes the contact 3R3 which in turn connects the energy from the line L2 through the contact 3R3, the terminal R3*b* and R4*a*, selector switch S4 to one side of the operating coil of relay R4 the other side of which can be energized by closing the push buttons 4P1 or 4P3 which complete the circuit through the lines LN and L1X respectively. Here again the energization of control relay R4 closes its contact 2R4 which is effective in closing contact X4 for retaining the energization of R4. The other contact 3R4 of relay R4 then supplies current from line L2 through contact 3R4 to post terminal R4*b* which supplies energy to one side of the coil of interlocking relay I1 and the contact 1A1 of interlocking shunting relay A1.

Since the circuit is completed for the relay R4 the circuit for relay I1 is likewise completed through the same circuit as it is placed in multiple with the relay R4 through the closing of the contact 3R4 and the contact 2A1 of the relay I1 is effective in a remote series to energize relay R5 which is not illustrated in this view. Upon the closing of a certain sequential number of relays in another group from R5 to R9, the second interlocking relay I2 of that group will be energized and will close its contact 1I2 which will supply current from L2 through contact 3R4, R4*b* contact 1I2 to terminal R10*a* selector switch S10 and one side of the operating coil of the relay R10 which in turn will be energized through the push buttons 10P1 or 10P3 as previously described and when this relay is energized its holding circuit will again be established through the contact X10 and its contact 3R10 will establish a circuit from line 2 through contact 3R10 to terminal R10*b* and thence to terminal R11*a* through selector switch S11 to one side of the operating coil R11 which in turn is energized in a similar manner to close its circuit. When the R11 relay is energized it in turn closes the contact 3R11 which supplies current to R11*b* from line 2 and thence proceeds to the terminals and selector switch of R12, R13, etc. In this manner any number of control relays may be supplied to produce a sequence from 1 to 57 or more or less depending upon the actual circuit which is being initiated.

Referring specifically to Fig. 3 it will be noted that the circuits as illustrated in the schematic wiring diagram of Fig. 2 are shown in the actual wiring diagram of Figs. 3 and 4 and each of the selector switches S1, S2, S3, S4, etc. and the interlocking contacts 3R1, 3R2, 3R3, 3R4 of relays R1, R2, R3, R4, etc. are shown to be connected to their respective terminals R1*a* and R1*b* which interlocking control terminals are shown in the two boards at the left of Figs. 3 and 4.

The starting or L1 side of the control circuit for control relays R1, R2, R3, R4, etc. is shown connected to a separate set of starting terminals on the lower part of Figs. 3 and 4 and the circuits for the control contactors C and CT, tripping relay T, interlock shunting relays A, B and A1 and stopping relay B are shown connected to a separate set of control line terminals and auxiliary control terminals on the lower left side of Figs. 3 and 4.

Since all the wiring of the different relays A, B, A1, C, CT, T, R1 to R4 and R10 to R13 is made permanent to these separate sets of terminals, it is very easy to connect these circuits not only with consecutive controls but also with each other and with external controls as shown in Fig. 4. Ordinarily in wiring up a panel of this character one might run a wire directly from the operating coil of these control relays to their respective line 2 or the selector switch or, in case of R1*b*, from the relay R1 contact to the operating coil of the relays A and B. However, in this particular invention the terminal boards are employed in order to complete the interconnecting circuits and thus leave undisturbed the sequential control relays in order to permit them to be similar in each group unit and in order to permit changing or revamping the whole circuit without changing the actual wiring of control elements such as push buttons, starters, control relays, etc. within the grouping. All changes will be done between the terminal boards as illustrated at the left of Fig. 4.

Referring again to Fig. 2 let it be assumed that it is desirable to dispense with the operation of the electric units controlled by the relays R2 and R3 but still it is desired to retain the operation of the electrical units controlled by control relays R1 and R4. In order to do this one merely depresses the push button 1P*a* and locks it in its closed position which completes the energization through the operating coil of relay A to the line L1X. This also opens the circuit of the back contact 2PA of the push button. However, the operation of relays R2 and R3 are dependent upon their respective holding contacts X2 and X3. The energization of relay A closes its contact 1A which connects R1*b* to R4*a*. However, the contact 1A of relay A is connected directly to its terminals A*b* and A*c* which are also placed on the control terminal board as shown at the left in Fig. 3. The connections R1*b* to A*b* and R4*a* to A*c* are made on the control terminal board as shown in Fig. 4. Upon the closing of contact 1A the operating function of R2 and R3 in supplying current to R4 through their contacts 3R2 and 3R3 has been eliminated and if it is desired to then de-energize the two relays R2 and R3 the push button PB may be depressed to energize relay B from terminal A*b* to line L1X and thus open contact B1 which de-energized R2, and R2 in turn de-energizes R3 by opening its front contact 3R2. Thus the energization of B is merely momentary. However, the energization of relay A is maintained as long as the push button 1PA is maintained closed. If it is desired to release push button 1PA the selector switches S2 and S3 may be swung through their *b* position, that is, connecting R2*a* to R2*b* and R3*a* to R3*b* respectively, which closes a multiple circuit with the contact 1A and would permit the release of push button 1PA to de-energize relay A and thus open contact 1A as the selector switches S2 and S3 are set to maintain the energization of relay R4 and any other relay that is energized in the sequence beyond this point.

If it is not desired to retain units R2 and R3 out of the circuit, then the switches S2 and S3 are left in the position as shown and the push button contact 1PA is closed and maintained closed for that period in which it is desired to stop R2 and R3 but permit R4 and the rest of the sequence to continue.

If it is desired to re-energize R2 and R3 after a temporary shutdown without opening R4 and other relays that are energized in the sequence beyond this point, push button PP which does not have a locking feature must be used in combination with push button contact 1PA. It is necessary to release the PA push button to close its back contact 2PA before R2 and R3 can be re-started by means of push buttons 2P3 and 3P3. The releasing of the PA push button also opens its front contact 1PA in the circuit of relay A which in turn would open its contact 1A followed by the opening of relay R4 and other relays that are energized in the sequence beyond R4.

Therefore it is necessary for the operator to close push button contact PP which establishes a multiple circuit across contact 1PA before he releases push button PA to connect control line L1X to push buttons 2P3 and 3P3. Contact PP maintains relay A and thus relay R4 in the closed position while 2P3 and 3P3 are operated to re-start R2 and R3 which then close their respective interlocking contacts 3R2 and 3R3. With 3R2 and 3R3 closed push button PP may be released and the control is returned to normal sequence connection.

Referring again to Fig. 2 it will be noted that tripping relay T is energized by means of push button 1PT. Upon the closing of push button 1PT, energy flows from line L1 through the push button to the operating coil of the relay T to the line L2. Upon the closing of tripping relay T the back contact T1 opens and thus de-energizes the circuit insofar as LN is concerned as contact C2 is opened. However, line L1X is still maintained because it is energized through the back contact of the test controller contact CT1. The cutout relay T may be energized by any one of a group of contacts PT which could be located at the central or master control panel or any one of the local control stations as illustrated in Figs. 1 and 3. Thus one really duplicates this contact in order to enable any one to cut out this particular group from any position in the plant.

The test control power relay CT cannot be energized unless both of the switches ST and SC are thrown into the position opposite to that shown and when this is done the power control relay CT becomes energized directly through these hand-operated switches from L1 to L2 and it closes its contact 1CT to energize the line L1T. It also de-energizes the line L1X by opening its back contact CT1. Since CT cannot be energized when C is energized or vice versa, contact CT is of course open which de-energizes LN. Thus the energization of the test relay CT maintains only L1T energized. Under these circumstances the only way that the relays in the group can be energized is by depressing push button 1P2, 2P2, or 3P2, etc. However, since line LN is de-energized the energization of relay R1 or any other relay of the series will not be maintained through holding contacts X1, X2, X3, etc. of the electric control unit and in order to take the place of this situation the control relays R1, R2, R3, etc. are provided with contacts 1R1, 1R2, 1R3, etc. which will form holding circuits for the relays R1, R2, R3 when the latter are energized. Thus the whole sequential series of relays may be established and operated in the manner as it would in operating the actual electrical units, and each of the conditions may be duplicated through the use of this test circuit L1T. In order that the motor or other electrical units will not operate during a test it is merely necessary to cut the power supply to the starters or motor control units of the group being tested. In this manner the whole of the circuit and its operation and interlocking arrangement may be checked without operating the plant by merely opening the main power circuit to the plant and keeping the control power circuit closed.

During the testing operation of one particular control panel it is necessary to duplicate the function of the interlocking relay such as the contact 1I2 as shown in Fig. 2. This is performed by employing a test relay A1 which provides a front contact 1A1 that is in multiple with 1I2 and may be energized by push button PA1 to close the circuit through the operating coil of the relay A1 which circuit will be maintained closed by another front contact 2A1 which performs a function as a holding contact and thus simulates the operation of the interlocking relay I2 which would be located in another group control panel. When the tests are completed and the circuit is shut down the relay A1 resets itself in order to re-establish the operation of the interlocking relay I2.

I claim:

1. A circuit connection for controlling a series of electrical units which operate in associated relation with each other to perform a series of operations on a commodity comprising a control relay for each electrical unit having electrical unit control contacts and electrical unit interlocking contacts, independent circuits connecting each electrical unit to its respective unit control contact, one current supply line connected with one side of each control relay interlocking contact, an interlocking terminal board having two sets of interlocking terminal posts, one of a first set of interlocking terminal posts connected to the other side of each interlocking contact, one of a second set of interlocking terminal posts connected to one side of each control relay operating coil, independent connections for the other side of each control relay operating coil to the other current supply line, and independent connections between selected of said interlocking terminals of each set to energize the operating coils of the control relays in a predetermined sequence.

2. The structure of claim 1 characterized in that the electrical units controlled are operated in a consecutive series and the interlocking contacts of the control relays are connected to control the operating coil of the next control relay in the operating series.

3. The structure of claim 1 which also includes a selector switch for each control relay, each selector switch having a heel that selectively connects with alternate selector contacts, the heel and one alternate selector contact of each selector switch interposed in the connection between each control relay operating coil and its interlocking terminal posts in said second set, and the other alternate selector contact of each selector switch connected to a selected one of said first set of interlocking terminal posts that are connected to said other side of the interlocking contacts.

4. The structure of claim 3 characterized in that the electrical units controlled are operated in a consecutive series and the interlocking contacts of the control relays are connected to control the operating coil of the next control relay in the operating series, and said other alternate contact of said selector switch when connected to its heel opens the operating circuit of its associated relay and transfers the electrical function to the next consecutive control relay of the series.

5. The structure of claim 1 which also includes a control terminal board having a third set of control terminal posts, said third set of control terminal posts interposed between said other side of each relay operating coil and said other supply line.

6. The structure of claim 5 which also includes a holding contact associated with each electrical unit, connections interposing each electrical unit holding contact between a control terminal post of the third set and said other current supply line to function as a holding circuit for the corresponding control relay.

7. A circuit connection for controlling a series of electrical units which operate in associated relation with each other to perform a series of operations on a commodity comprising a control relay for each electrical unit having electrical unit control contacts and electrical unit interlocking contacts, independent circuits connecting each electrical unit to its respective unit control contact, one current supply line connected with one side of each control relay interlocking contact, an interlocking terminal board having two sets of interlocking terminal posts, one of a first set of interlocking terminal posts connected to the other side of each interlocking contact, one of a second set of interlocking terminal posts connected to one side of each control relay operating coil, independent connections for the other side of each control relay operating coil to the other current supply line, independent connections between selected of said interlocking terminal posts of each set to energize the operating coils of the control relays in a predetermined sequence, a control terminal board having a third set of control terminal posts, said third set of control terminal posts interposed between said other side of each relay operating coil and said other supply line, and a holding contact associated with each electrical unit, connections interposing each electrical unit holding contact between a control terminal post of the third set and said other current supply line to function as a holding circuit for the corresponding control relay, and a starting push button connected in multiple with each holding contact.

8. A circuit connection for controlling a series of electrical units which operate in associated relation comprising a control relay for each electrical unit having electrical unit control contacts and electrical unit interlocking contacts, one current supply line connected with one side of each control relay interlocking contact, an interlocking terminal board having two sets of interlocking terminal posts, one of a first set of interlocking terminal posts connected to the other side of each interlocking contact, one of a second set of interlocking terminal posts connected to one side of each control relay operating coil, independent connections for the other side of each control relay operating coil to the other current supply line, independent connections between selected of said interlocking terminal posts of each set to energize the operating coils of the control relays in a predetermined sequence, a control terminal board having a third set of control terminal posts, said third set of control terminal posts interposed between said other side of each relay operating coil and said other supply line, and a holding contact associated with each electrical unit, connections interposing each electrical unit holding contact between a control terminal post of the third set and said other current supply line to function as a holding circuit for the corresponding control relay, a starting push button connected in multiple with each holding contact, said other and second current supply line associated with said holding contact, a third supply line associated with said control relay, said first push button being connected to the said second current supply line associated with said holding contact, and a second push button connected in multiple with said first push button by connecting the same to said third current supply line associated with said relay placing the second push button at the location of the relay and the first push button at the location of said electrical unit.

9. The structure of claim 8 characterized in that said third current supply line is a testing line, a testing relay having one side of its operating coil connected to the first current supply line, a selector switch connecting the other side of said testing relay operating coil to said other current supply line, a contact operated by said test relay for energizing said third current supply line when said selector switch is closed, and a control relay holding contact connected between said other side of each relay operating coil and said third or test current supply line.

10. The structure of claim 9 which also includes connections between said test selector switch to alternately connect said circuit breaker operating coil and said test circuit relay coil to said other current supply line.

11. The structure of claim 10 characterized in that said test selector switch comprises two independent heel members connected together and each having two contacts, one contact of each test selector switch being connected to said other current supply line and the other contacts being connected to the circuit breaker operating coil and the test relay operating coil respectively.

12. The structure of claim 8 which also includes a circuit breaker having contact means for energizing said second current supply line.

13. The structure of claim 10 which also includes a fourth current supply line of the same polarity as said second and third supply lines and being supplied with current ahead of the contact means of said circuit breaker, and a third push button connected in multiple with each of said other push buttons by connecting the same to the fourth current supply line.

14. The structure of claim 1 which also includes circuit closing means to shunt the interlocking contacts of selected control relays.

15. The structure of claim 14 characterized in that said circuit closing means to shunt the contacts is a push button.

16. The structure of claim 15 characterized in that said circuit closing means to shunt the contacts is an interlock shunting relay having its control coil connected between the current supply lines and having contacts for shunting selected of said interlocking contacts.

17. The structure of claim 16 which also includes a push button in the energizing coil circuit of the interlocked shunting relay, and a holding contact of said interlocked shunting relay connected in multiple with said push button.

18. The structure of claim 17 which also includes a master control relay having its energizing circuit connected between said current control lines and having a contact in the circuit of the energizing coil of the interlocked shunting relay.

19. The structure of claim 16 which also includes a cut out relay having its operating coil connected in a series with a push button and between the current supply lines, and having a back contact for interrupting the operating coils of a selected group of control relays the interlocking contacts of which have been shunted by the contacts of the interlock shunting relay.

20. A circuit connection for controlling a series of electrical units which operate in associated relation comprising a control relay for each electrical unit having electrical unit control contacts and electrical unit interlocking contacts, one current supply line connected with one side of each control relay interlocking contact, an interlocking terminal board having two sets of interlocking terminal posts, one of a first set of interlocking terminal posts connected to the other side of each interlocking contact, one of a second set of interlocking terminal posts connected to one side of each control relay operating coil, independent connections for the other side of each control relay operating coil to the other current supply line, independent connections between selected of said interlocking terminal posts of each set to energize the operating coils of the control relays in a predetermined sequence, circuit breaker means having its energizing current connected across said current supply lines and having contact means to interrupt the supply of current to said control relays, a trip relay having one side of its operating coil connected to one current supply line and the other side of its operating coil connected to said other supply line, a back contact of said trip relay interposed in the circuit of the operating coil of said circuit breaker and circuit closing means interposed in the circuit of the operating coil of the trip relay which when actuated will energize the trip relay and de-energize the operating coils of the circuit breaker.

21. The structure of claim 20 characterized in that said circuit closing means in the circuit of the operating coil of the trip relay is a plurality of push buttons connected in multiple and stationed at different locations.

References Cited in the file of this patent

UNITED STATES PATENTS

| | | |
|---|---|---|
| 2,324,474 | Appel | July 20, 1943 |
| 2,372,130 | Smith | Mar. 20, 1945 |
| 2,510,163 | Wood | June 6, 1950 |
| 2,595,083 | Kilgen | Apr. 29, 1952 |